United States Patent [19]

Johnson, Jr. et al.

[11] Patent Number: 4,980,812

[45] Date of Patent: Dec. 25, 1990

[54] UNINTERRUPTED POWER SUPPLY SYSTEM HAVING IMPROVED POWER FACTOR CORRECTION CIRCUIT

[75] Inventors: Robert W. Johnson, Jr., Raleigh; Joseph C. Paulakonis, Chapel Hill, both of N.C.

[73] Assignee: Exide Electronics, Raleigh, N.C.

[21] Appl. No.: 434,845

[22] Filed: Nov. 9, 1989

[51] Int. Cl.⁵ ............................................ H02M 3/335
[52] U.S. Cl. ......................................... 363/44; 363/37; 363/89; 363/126
[58] Field of Search ....................... 363/16, 17, 44–48, 363/37, 89, 124, 126

[56] References Cited

U.S. PATENT DOCUMENTS

| | | | |
|---|---|---|---|
| 4,193,111 | 3/1980 | Wester | 363/126 |
| 4,412,277 | 10/1983 | Mitchell | 363/89 |
| 4,437,146 | 3/1984 | Carpenter | 363/21 |
| 4,472,672 | 9/1984 | Pacholok | 363/89 |
| 4,533,986 | 8/1985 | Jones | 363/17 |
| 4,661,764 | 4/1987 | Mostyn et al. | 323/222 |
| 4,677,366 | 6/1987 | Wilkinson et al. | 363/89 |
| 4,683,529 | 7/1987 | Bucher, II | 363/44 |
| 4,825,351 | 4/1989 | Uesugi | 363/89 |
| 4,831,508 | 5/1989 | Hunter | 363/126 |

OTHER PUBLICATIONS

PP. 3–346 through 3–352 of Motorola Linear/Interface Devices Databook.
Article entitled "IC Produces 0.99 Power Factor In-Office Power Supplies", *Powertechnics Magazine*, Jun. 1989, p. 17.
Article entitled "PWM Controller Chip Fixes Power Factor", Goodenough, Frank, *Electronic Design Magazine*, Jun., 1989, pp. 81–84.
S. D. Freeland, Input Current Shaped AC-to -DC Converters, Final Report prepared for NASA Lewis Research Center under Grant No. NAG. 3–615, May 1986, by the Power Electronics Group, California Instit. of Tech.

*Primary Examiner*—Peter S. Wong
*Attorney, Agent, or Firm*—Woodcock, Washburn, Kurtz, Mackiewicz & Norris

[57] ABSTRACT

An uninterrupted power supply (UPS) system is provided with a power factor correction circuit. The UPS system includes a rectifier having input terminals for connection to an AC utility power source and output terminals. The power factor correction circuit is operatively connected to the input and output terminals of the rectifier to cause the UPS system to exhibit substantially unity power factor to the AC utility power source.

13 Claims, 4 Drawing Sheets

UNINTERRUPTED POWER SUPPLY SYSTEM HAVING IMPROVED POWER FACTOR CORRECTION CIRCUIT

BACKGROUND OF THE INVENTION

The present invention relates to an uninterrupted power supply (UPS) system and more particularly to an UPS systems having an improved power factor correction circuit.

It may be explained here that computer work stations require ever increasing power requirements, especially those with advanced graphic displays. These power requirements are approaching 1000 to 1200 watts of power. In theory this should not present a problem because 1725 watts of power should be available from a 15 amp, 115 volt wall outlet. In the United States, Underwriters Laboratories, however, limits current draw to 12 amps and, therefore the power to 1380 watts. With the efficiency of a typical power supply being 85%, a power factor of 0.7 and a low line voltage of 110 volts, the maximum power which can be drawn from the standard wall outlet becomes less than 800 watts. A power factor of 0.7 effectively reduces the power available from the AC utility power source by about 30%. It is for this reason that there is an increasing need to provide power supplies with improved power factor correction. Under so-called "brown out" conditions, i.e. the utility reducing the voltage available by 5%, the power that can be drawn is even further reduced to less than 700 watts.

Another factor promoting the need for improved power factor correction is that in Europe, after 1992, electronic equipment drawing more than 300 watts of rectified AC line power and driving a capacitive input filter must have power-factor correction.

This emphasis on power factor correction is also applicable to UPS systems. There is disclosed in copending application Ser. No. 366,098, assigned to the same assignee as the subject application and which is hereby incorporated by reference herein, a UPS system which maintains the integrity of the neutral conductor of the AC utility power source while eliminating the 50 or 60 Hz transformer thereby actually reducing the overall cost, size and weight of the UPS system. The power factor correction circuit in accordance with the present invention has particular application to the UPS system disclosed in copending application Ser. No. 366,098.

SUMMARY OF THE INVENTION

The present invention provides a UPS system having an improved power factor correction circuit in response to, and in satisfaction of, the need for power supplies having improved power factor correction.

Briefly, and in accordance with the invention, there is provided an uninterrupted power supply (UPS) system comprising rectifier means having a first input terminal for connection to the ungrounded conductor of an AC utility power source, a second input terminal for connection to the grounded conductor of said AC utility power source, a first output terminal and a second output terminal. First and second load terminals are provided for connection to a load. The second input terminal of the rectifier means is connected to the first load terminal. A first capacitor is provided which is connected between the first output terminal of the rectifier means and the first load terminal. A second capacitor is provided which is connected between the second output terminal of the rectifier means and the first load terminal. The rectifier means produces rectified line +DC voltage across the first capacitor and produces rectified line −DC voltage across the second capacitor when the first and second input terminals of the rectifier means are connected, respectively, to the ungrounded conductor and grounded conductor of the AC utility power source.

The UPS system further includes inverter means and power factor correction circuit means. The inverter means is operatively connected to the first and second output terminals of the rectifier means and the second load terminal for converting the direct current voltages produced by the rectifier means to AC voltages across the first and second load terminals. The power factor correction circuit means are operatively connected to the first and second input terminals of the rectifier means and operatively connected to the first and second output terminals of the rectifier means for controlling the alternating current input current received by the UPS system to cause the UPS system to exhibit substantially unity power factor to the AC utility power source.

A more complete understanding of the invention will be had upon consideration of the ensuing specification, particularly when considered in light of the appended drawings, directed toward a particular embodiment of the invention.

DESCRIPTION OF THE PREFERRED EMBODIMENT

Figure 1:
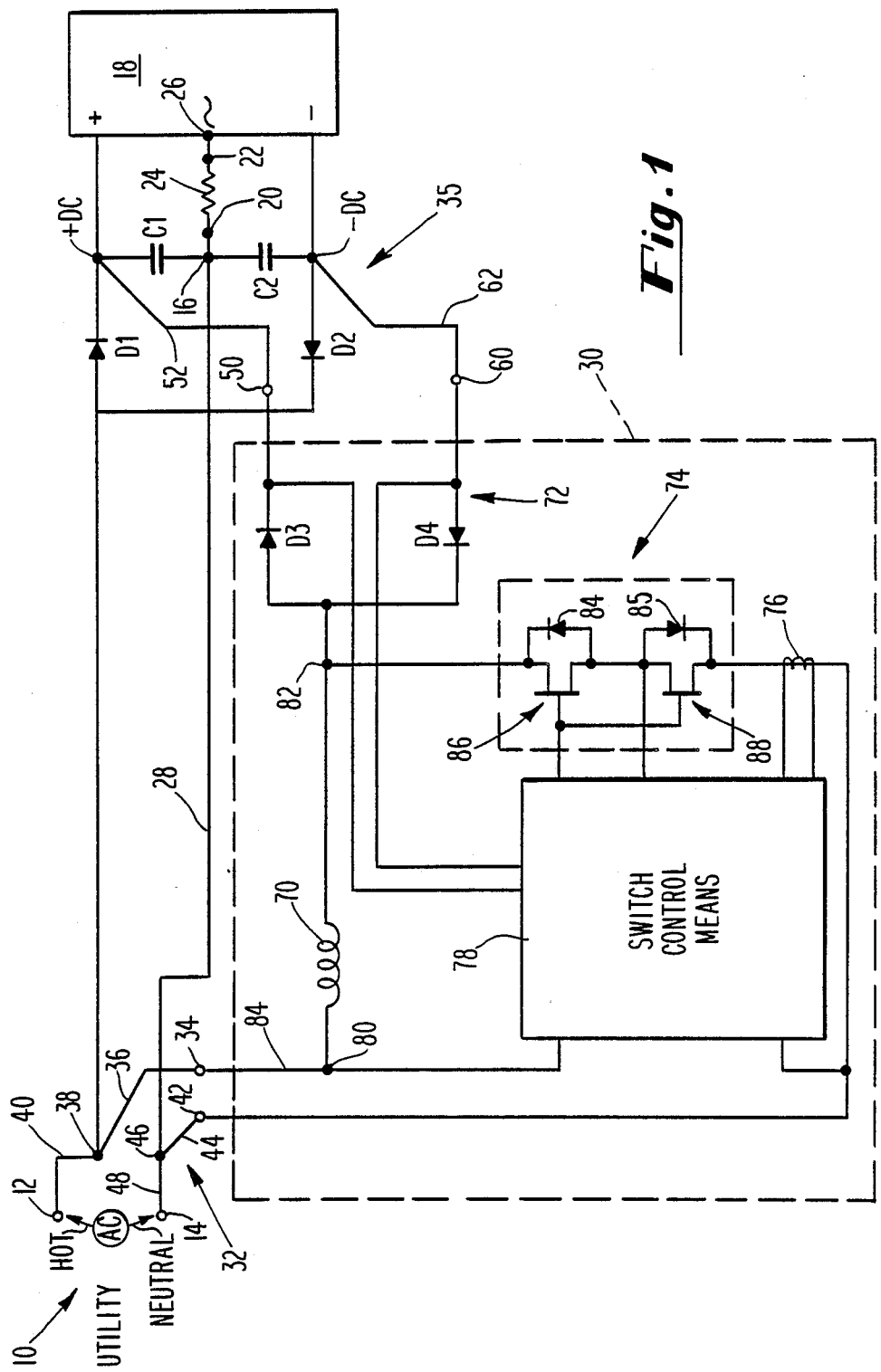
FIG. 1 is a schematic diagram of a UPS system which incorporates the power factor correction circuit of the present invention.

Referring now to the drawings wherein like reference numerals refer to like parts throughout the several Figs., there is shown in FIG. 1 a schematic diagram of a UPS system which incorporates the power factor correction circuit of the present invention. An AC utility power source is diagrammatically represented and shown generally at 10. Utility power is supplied to first and second input terminals 12 and 14, respectively, of a rectifier means comprising diodes D1 and D2. The first input terminal 12 is designated as the "HOT" terminal and terminal 14 is designated as "NEUTRAL". The hot terminal 12 is connected to a first or the ungrounded conductor of the AC utility power source and the neutral terminal 14 is connected to a second or the grounded conductor of the AC utility power source. The utility AC voltage is rectified to obtain direct current (DC) voltage by the diodes D1 and D2 in conventional fashion to obtain direct current voltage, as will be understood to those skilled in the art, producing a +DC voltage at a first output terminal labeled +DC in FIG. 1 and a −DC voltage at a second output terminal labeled −DC in FIG. 1 and across a first capacitor C1 and a second capacitor C2, respectively, with respect to the neutral point 16. The DC is then processed by the inverter 18 to produce AC voltages at the pair of load terminals comprising first load terminal 20 and second load terminal 22. The inverter 18 includes a battery (not shown) to provide back-up power to the UPS system as is well understood to those skilled in the art. From the foregoing, it will be understood that the rectifier means comprising diodes D1, D2, first input terminal 12, second input terminal 14, first output terminal +DC and second output terminal −DC produces rectified +DC voltage across capacitor C1 and produces rectified line −DC voltage across capacitor C2, respectively, with respect to the node 16 when the first and second input terminals 14, 16 are connected, respectively, to the ungrounded conductor and grounded conductor of the AC utility power source.

A load 24 is shown connected across the load terminals 20, 22 with the inverter AC terminal 26 being connected to load terminal 22 and the neutral terminal 14 being connected directly to the node 16 via conductors 48 and 28. In operation, when the utility voltage, i.e. 120 volts, is applied to the diodes D1 and D2, the action of the circuit of FIG. 1, as thus far described, causes a positive voltage equal to the line peak voltage, i.e. 170 volts, across capacitor C1 and a negative voltage equal to the negative line peak voltage, i.e. −170 volts, across capacitor C2. The inverter 18 operates using the available voltages across capacitors C1 and C2 to produce an AC voltage at the AC terminal of the inverter or across load terminals 20, 22. The circuit of FIG. 1, as just described, i.e. the existing UPS system, draws relatively high input currents from the AC utility power source near the peak of the utility voltage waveform and near zero current for the remainder of the cycle. This results in poor power factor, and higher RMS currents being drawn from the AC utility power source than would be required if the power factor were improved.

Continuing with the description of the circuit shown in FIG. 1, a power factor correction circuit is shown contained within the dashed line block 30. This power factor correction circuit 30 when connected to the AC utility power source or rectifier means input terminals 12, 14, as shown generally at 32, and, to the output terminal terminals +DC, −DC, as shown generally at 35, will enhance the performance of the UPS system in that the alternating current input current received by the UPS system will be controlled to cause the UPS system to exhibit substantially unity power factor to the AC utility power source.

The power factor correction circuit 30 includes input correction means for connection to the AC power source comprising a first input means 34 connected to the first input terminal 12 via lead 36, node 38 and lead 40 and a second input means 42 connected to the second input terminal 14 via lead 44, node 46 and lead 48. Circuit 30 also includes a first output means 50 connected to the first or +DC terminal of the rectifier means via lead 52 and a second output terminal 60 connected to the second or −DC terminal of the rectifier means via lead 62. Therefore, the power factor correction circuit 30 is connected in parallel to the existing UPS system as first described above. The power factor correction circuit further comprises an inductor means 70, a rectifier means shown generally at 72, switch means shown generally at 74, current sensing means or current transformer 76, and switch control means 78.

The inductor means 70 has a first inductor terminal 80 and a second inductor terminal 82. The first inductor terminal 80 is connected to the input means 34 via lead 84 and second inductor terminal 82 is connected to rectifier means 72 comprised of diodes D3 and D4. The rectifier means 72 will hereinafter sometimes be referred to as the second rectifier means to distinguish rectifier means 72 from the rectifier means comprising diodes D1 and D2. The switch means 74 comprises a pair of diodes 84 and 85 and two series N-channel power field effect transistors (FET) 86 and 88 connected source-to-source allowing bidirection current flow. The switch control circuit 78 operates in a manner such that the switch means 78 can be controlled to conduct current in either direction thereby forming an AC switch.

Prior to describing further details of the power factor correction circuit, namely, the details of the switch control means 78, a brief overall description of the operation of the circuit shown in FIG. 1 will be given with details of operation being explained more fully hereafter as the description of FIGS. 2 and 3 proceeds. With the input connection means 34, 42 connected to the AC utility power source, i.e., with terminals 12 and 14 connected to the AC utility power source and terminals 34 and 42 being connected to terminals 12 and 14, respectively, during the positive half cycle, through the action of switch control means 78, the switch 74 closes and input current charges the inductor 70 because the inductor 70 is then connected across the AC utility power source. The diodes D1 and D2 and the diodes D3 and D4 are back-biased because of the voltages at the +DC terminal and −DC terminal and are therefore not conducting current. The current flowing through the inductor 70 is sensed or monitored by the switch control means 78 via the current transformer 76. While the current transformer 76 is depicted and located in FIG. 1 after the switch 74, it will be evident that the current transformer 76 may be located directly after the inductor 70 to sense the amount of input charging current passing through the inductor 70. When the current flowing through the switch 74 has increased to a desired value, as determined by the switch control means 78, the switch means 74 is turned off, i.e. opened. The current flow in inductor 70 will then begin to decay or diminish as the input current is discharged from the inductor 70 into the diode D3. The current is rectified by diode D3 and flows into capacitor C1 which receives the rectified inductor current and charges to the voltage produced when the inductor 70 is discharged.

The switch control means 78 is arranged to effect a fixed off time for the switch means 74, i.e. hold the switch means 74 open, and a variable on time for the switch means 74, i.e., keep the switch means 74 closed. When the switch means 74 again closes, the input current from the AC utility power source will again charge the inductor 70. The operation of the switch means 74 is repeated to furnish sufficient current amplitude to the capacitor C to maintain the voltage across C1 at a desired positive value, i.e. 180 volts to 200 volts. The action of the switch control means 78 is similar when the utility voltage is negative except that current discharged from the inductor 70 will flow through the diode D4 and into capacitor C2 in a manner to maintain the voltage across the capacitor C2 to the desired negative voltage, i.e. −180 volts to −200 volts. The switch means 74 is alternately closed and opened by the switch control means 78 such that the waveform of the total current, comprising both the input current charged into the inductor 70 and input current discharged from the inductor 70, passing through the inductor 70 is substantially similar to or a replica of and is substantially in phase with the line voltage of the AC utility power source. It will be understood to those skilled in the art that under such circumstances the UPS system exhibits substantially unity power factor to the AC utility power source.

Figure 2:
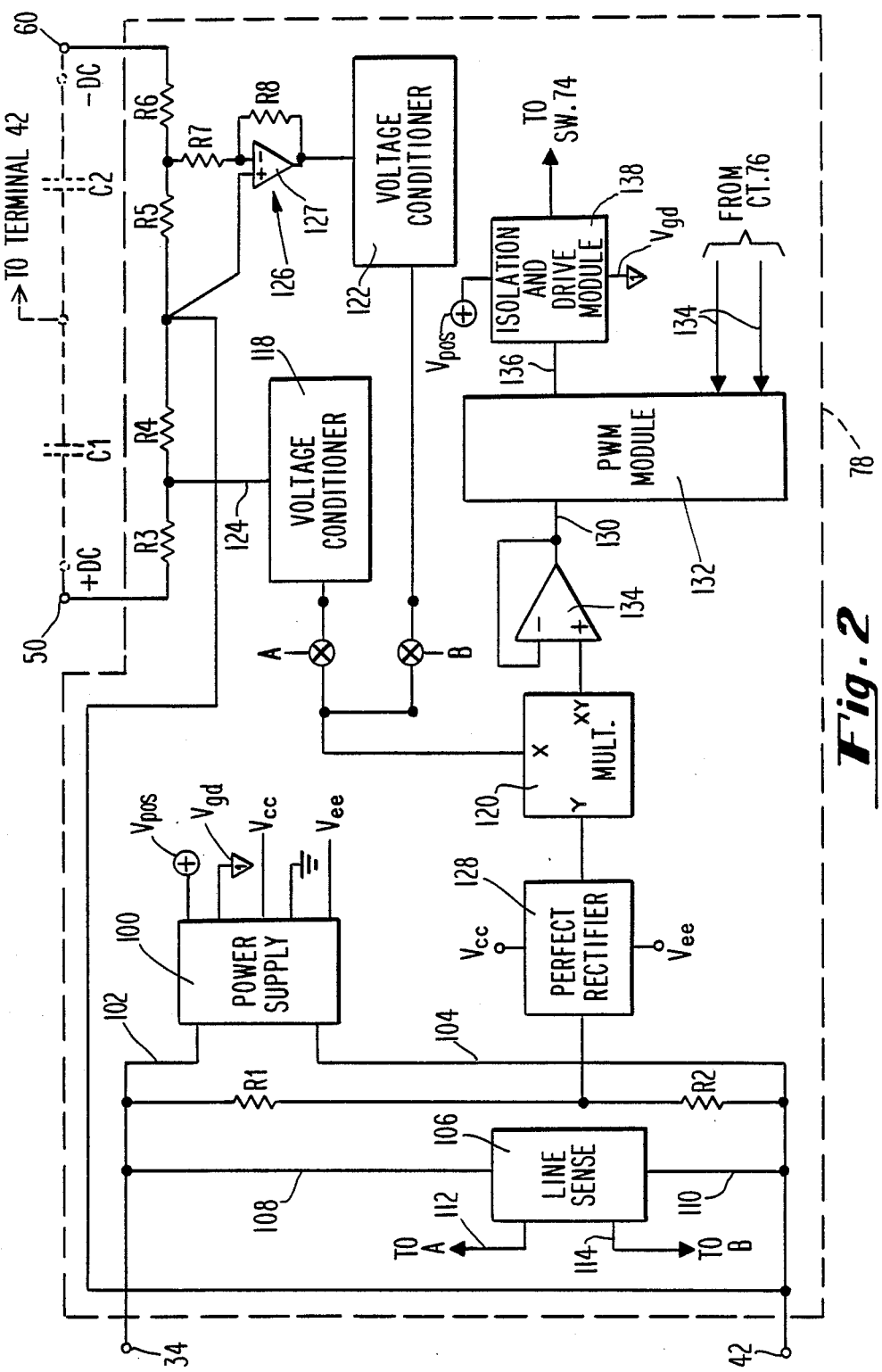
FIG. 2 is a block diagram of switch control means in accordance with the invention.

Referring now to FIG. 2, the switch control circuit 78 is shown in block form within dashed lines. The connection of the switch control circuit 78 to the UPS system is via terminals 34, 42 and terminals 50, 60. Contained with the switch control circuit 78 is a power supply 100 which is connected to the terminal 34 via lead 102 and to terminal 42 via lead 104. The power supply 100 essentially has two purposes. The first is to provide the necessary logic power to the remainder of the switch control means 78 through supply terminals Vcc and Vee and the second is to provide an isolated power supply across terminals $V_{POS}$ and $V_{gd}$ that is used to furnish power to operate the switch means 74.

A line sense means 106 is connected to the terminal 34 via lead 108 and to terminal 42 via lead 110. The line sense 106 essentially comprises a control circuit for effecting the opening and closing of a suitable first switching element A and a suitable second switching element B. The line sense means has a first output 112 coupled to the first switching means A and a second output 114 coupled to the second switching means B. When the AC power source is positive, terminal 34 being more positive that terminal 42, the switching means A is closed by the action of the line sense means 106 and switch means B is open. Conversely, when the AC power source is negative the switch means A is open and switch means B is closed. Line sense means 106, therefore, alternatively connects a voltage conditioner 118 to the "X" input terminal of a multiplier circuit 120 when the AC power source is positive and voltage conditioner 122 to the "X" input terminal of multiplier 120 when the utility power source is negative.

Continuing with the description of the switch control means 78, the resistors R3, R4, R5 and R6, are operatively connected to the rectifier means D3, D4, with resistors R3 and R4 comprising a first scaling means for providing a first signal proportional to the voltage across the capacitor C1 when the output connection means or terminals 50, 60 are connected to the electrical circuit in which the capacitor C1 is incorporated, e.g. the UPS system as first described in reference to FIG. 1. The first signal proportional to the voltage across the capacitor C1 is coupled to the voltage conditioner 118 via lead 124. The resistors R5 and R6 comprise a second scaling means for providing a second signal proportional to the voltage across the capacitor C2 when the output connection means or terminals 50, 60 are connected to the electrical circuit in which the capacitor C2 is incorporated. The second signal proportional to the voltage across the capacitor C2 is coupled to the voltage conditioner 122 via resistor R7 and inverter amplifier shown generally at 126 and comprising amplifier 127 and feedback resistor R8.

The switch control means 78 also includes resistors R1 and R2 operatively connected to the input connection means 34, 42. The resistors R1 and R2 comprise third scaling means for providing a third signal which is proportional to the instantaneous line voltage of the AC utility power source when the input connection means 34, 42 are connected to the AC utility power source. The third scaling means (R1, R2) are coupled to the second or "Y" input of the multiplier 120 via a so-called perfect rectifier 128. The multiplier 120 functions in a manner to produce an output voltage signal on its "XY" output terminal which is a replica of the instantaneous line voltage of the AC utility power source multiplied alternately by output voltages of the voltage conditioners 118 and 122. In this manner, the output voltages of the voltage conditioners 118, 122, changes or modifies the amplitude of the output voltage of the perfect rectifier which is applied to the "Y" terminal of the multiplier 120. The output of the multiplier circuit 120 is coupled to the first input 130 of a pulse width modulation (PWM) module or means 132 via an impedance change device or follower 134. In this way, the high output impedance of the multiplier 120 is converted to a low impedance compatible with the low input impedance of the PWM module 132.

The PMW module has a second input means 134 coupled to the current sensing means 76 and an output means 136 coupled to the switch means 74 via an isolation and drive module 138. As will become more evident hereinafter in the description of FIG. 3, the PWM module 132 uses the output of the multiplier 120 to determine the total current that is required to flow in the inductor 70 and pass through switch mean 74 to produce a fundamental, i.e., 60 Hz, input current to the UPS system that has a wave form that is substantially a replica of and is substantially in phase with the line voltage of the AC utility power source thereby producing a power factor of substantially one (1.0).

Figure 3:
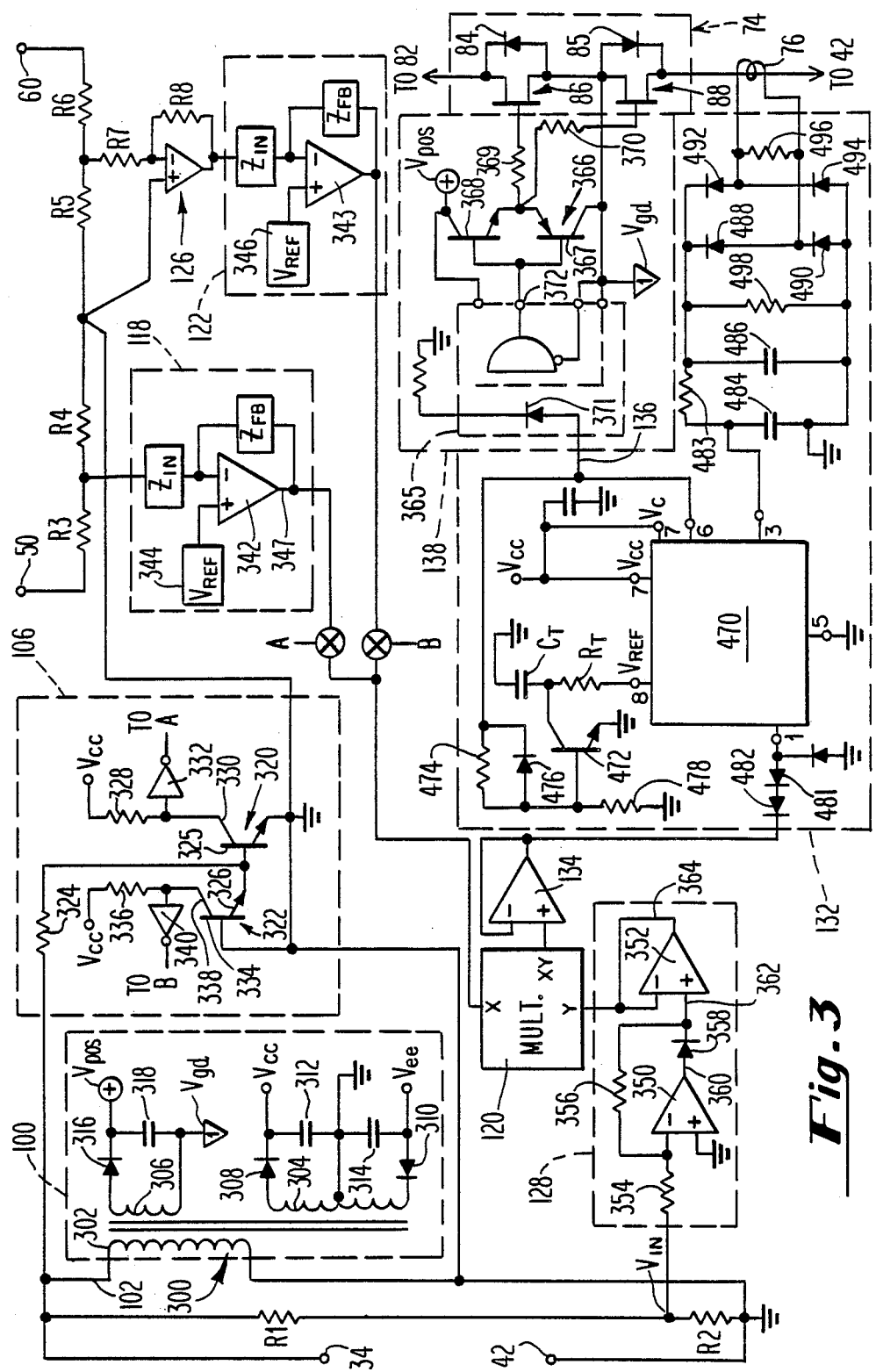
FIG. 3 is an electrical schematic diagram illustrating details of the block diagram of FIG. 2.

Referring now to FIG. 3, the power supply 100 comprises a transformer shown generally at 300 that has an input winding 302 connected to the terminals 34 and 42. The transformer 300 has two additional windings 304 and 306. The first additional winding 304 is a center tapped winding that is connected to the diodes 308 and 310 and capacitors 312 and 314 to form the two logic supplies, i.e. positive voltage supply Vcc and negative voltage supply Vee. The second additional winding 306 is to obtain an isolated supply to operate the isolation and drive module 138. The second winding 306 of transformer 300 is connected to the diode 316 and capacitor 318 to produce the isolated positive supply voltage $V_{POS}$ and $V_{gd}$ (Gnd 1).

The line sensing means 106 is comprised of the transistors 320 and 322. The resistor 324 is connected to the terminal 34 and to the base 325 of transistor 320 and to the emitter 326 of the transistor 322. During the positive half cycle of the AC utility power source, current flows into the base 325 of the transistor 320, and a current will flow in the load resistor 328, causing a low voltage at the collector 330 of transistor 320. As a result of the low voltage at the collector 330, a high voltage or a first switching signal will appear at the output of the inverter or not device 332 and be applied to switching means A to close the switching means A. Conversely, during the negative half cycle of the AC utility power source, current flows in the emitter 326 and base 334 of transistor 322. The transistor 322 will cause a current to flow in the load resistor 336 and a low voltage will appear on the collector 338 of the transistor 322 and a corresponding high voltage or second switching signal will appear on the output of the inverter or not device 340 and be applied to switching mean B to close the switching means B. From the foregoing it will be understood that the switching means A is closed during the positive half cycle of the AC utility power source and open during the negative half cycle and that switching means B is closed during the negative half cycle of the AC utility power source and open during the positive half cycle.

Referring now to the voltage conditioners 118 and 122, each is comprised of an operational amplifier, designated 342 in voltage conditioner 118 and designated 343 in voltage conditioner 122; feedback elements Zin and Zfb; and, reference voltage signal generating means with the reference voltage generating means of voltage conditioner 118 being designated as 344 and that in voltage conditioner 122 being designated as 346.

The purpose of feedback elements Zin and Zfb are to produce an error voltage that is relatively constant over the line period, i.e. the AC utility power source fundamental period or 60 Hz. The reason to maintain the error voltage constant over the fundamental waveform is to reduce the distortion of the current waveform as a result of ripple on the capacitors C1 and C2.

The voltage appearing at terminal 50 is reduced by the resistors R3 and R4 (the before described first scaling means) to provide a voltage signal proportional to the voltage across capacitor C1 (the before described first signal). This reduced value or first signal is compared in amplifier 342 against the voltage reference or first reference signal generated by reference voltage generating means 344. This first reference signal can be generated as a precision voltage source or zener voltage and is representative of a desired voltage level across the capacitor C1. The resultant difference between the first reference voltage signal and the scaled voltage or first signal is produced or generated by the operational amplifier or first error signal generating means 342 and appears as a first error signal on the output of the first error signal generating means 342.

The voltage appearing at terminal 60 is reduced by the resistors R5 and R6 (the before described second scaling means) to provide a voltage signal proportional to the voltage across capacitor C2 (the before described second signal). This reduced value or second signal after inversion by the inverter amplifier 126 is compared in amplifier 343 against the voltage reference or second reference signal generated by reference voltage generating means 346. This second reference signal can also be generated as a precision voltage source or zener voltage and is representative of a desired voltage level across the capacitor C2. The resultant difference between the second reference voltage signal and the scaled voltage or second signal is produced or generated by the operational amplifier or second error signal generating means 343 and appears as a second error signal on the output of the second error signal generating means 343.

From the foregoing, it will be understood that the output or error signals of the first and second error signal generating means 342 and 343, respectively, are selectively applied to the "X" input of the multiplier 120 by reason of the action of the line sensing means 106 selectively opening and closing switch means A and B. In other words, the line sensing means 106 provides a first switching signal to first switching means A during each positive half cycle of the AC utility power source to close the first switching means A and effect application of the first error signal to the first or "X" input of the multiplier 120. The line sensing means 106 also provides a second switching signal to the second switching means B during each negative half cycle of the AC utility power source to close the second switching means B and effect application of the second error signal to the first or "X" input of the multiplier 120. The multiplier 120, in a preferred embodiment, comprises multiplier model MC1495L, manufactured and sold by Motorola Inc., or its equivalent. The switch control circuit means 78 can maintain the voltages seen at terminals 50 and 60 independently as long as the voltages across capacitors C1 and C2 exceed the peak voltages of the AC utility power source in both the positive and negative directions.

Referring now to the perfect rectifier 128, the perfect rectifier 128 is comprised of two operational amplifiers 350 and 352. Amplifier 350 is connected as an inverting amplifier of unity gain where the resistors 354 and 356 are equal but a diode 358 is placed in series with the output 360 of the amplifier 350. The characteristics of the modern operational amplifiers approach the ideal, where the input impedance is infinite, output impedance is zero and the voltage between the two inputs of the amplifier is zero or "virtual" ground in a properly operating amplifier circuit. In the perfect rectifier circuit 128, during the negative half cycle of the AC utility power source, the scaled voltage or third signal, −Vin, (derived from the scaling means R1 and R2 as described above) is applied to the resistor 354, and since the negative input is at virtual ground, the current flowing in the resistor 354 is given by Vin/R. Since this current cannot flow in the input of the amplifier 350, the current must flow in the resistor 356. The values of the resistors 354 and 356 are equal and since the same current flows in both resistors 354, 356, the magnitude of the voltages are equal only the polarity has changed. This is the essence of the inverting amplifier. The fact that the amplifier output 360 is connected to the resistor 356 by diode 358 has no effect to the voltage applied to the input of the amplifier 352, namely Vin. During the positive portion of the utility voltage, the scaled voltage or third signal is applied to the resistor 354. Unlike the previous condition, the amplifier 350 is not acting as an operational amplifier due to the action of the diode 358 preventing current from flowing in the resistors 354 and 356. Since the amplifiers 350, 352 have no current flowing in the inputs, the voltage appearing at the resistor 354 is the same as the voltage at the positive input 362 of the amplifier 352. The amplifier 352 is configured as a follower and the input voltage equals the output voltage. Therefore, the action of the circuit is to produce a voltage at the output 364 of amplifier 352 equal to the rectified scaled utility voltage without the diode drops that would accompany normal rectification. The purpose of the perfect rectifier circuit 128 is to provide a unipolar signal that is more readily usable by the remaining portions of circuit, e.g., the PWM chip, to which its output is supplied and it would not be required to be present in the switching control circuit 78 if all remaining portions of the circuit are modified to permit the use of bipolar signals.

From the foregoing it will be understood that the third scaling means (R1, R2) provides a third signal proportional to the instantaneous line voltage of the AC utility power source and that such third signal is applied to the multiplier "Y" input terminal via the perfect rectifier 128. As indicated above, the multiplier 120 produces an output voltage signal on its "XY" output terminal which is replica of the instantaneous line voltage of the AC utility power multiplied alternately by the output voltages of the voltage conditioners 118 and 122, i.e. multiplied alternately by the first error signal and second error signal produced, respectively, by the operation amplifiers 342 and 343. As indicated above, the "XY" output of the multiplier 120 is coupled to the first input of the PWM module 132 via follower 134.

Figure 4:
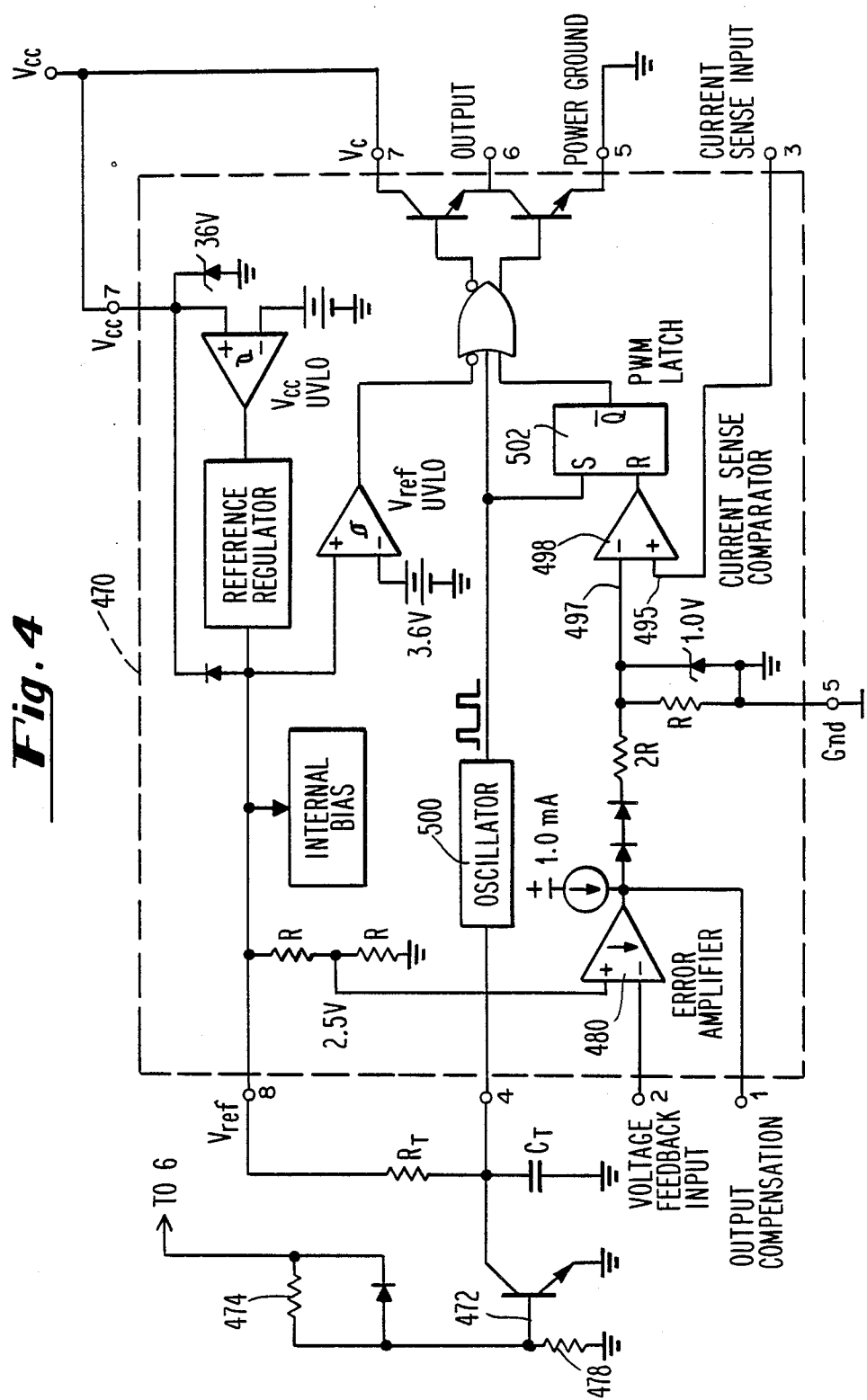
FIG. 4 is an electrical schematic diagram illustrating details of the pulse width modulation means forming a part of the switch control means illustrated in block form in FIG. 2.

With reference now to FIGS. 3 and 4, the PWM module 132 includes a chip 470 which in a preferred embodiment, comprises a high performance, fixed frequency, current mode controller model UC3843A, manufactured and sold by Motorola Inc., or its equivalent. The chip 470 is well described in the Motorola literature and only its basic operation will be described here. In addition to the chip 470, circuit elements comprising capacitor $C_T$, resistor $R_T$, transistor 472, resistor 474, diode 476 and resistor 478 are utilized to implement a constant off type operation of the PWM chip 470. That is, the "on time" is variable and the "off time" is constant in this mode of operation. The normal error amplifier 480 in the chip 470 is not used but the output of the voltage follower 134 is connected to the output compensation pin 1 of the chip 470 and results in the current produced in the current transformer 76 to follow the signal from the output of the voltage follower 134, as will be further explained hereinafter. The diodes 481 and 482 couple the voltage follower 134 to the chip 470 to balance out the internal two diode offset of the PWM chip 470. Also operatively connected to the chip 470 and forming a part of the PWM module is a noise filter comprised of resistor 483, and capacitors 484 and 486; a bridge circuit comprised of diodes 488, 490, 492, 494 and resistor 496; and a burden resistor 498.

The current passing through the AC switch 74 is controlled by a switching control signal produced by the chip 470 at pin 6 thereof. This switching control signal is then coupled to the switch 74 through the action of the isolation and drive module 138 which will be described more fully below. When the switching control signal is low or zero volts, the switch 74 is "off" or not conducting current. Conversely, when the switching control signal is high, the switch 74 is "on" or conducting current. When the switch 74 is "on" the input current flowing from the AC utility power source and charging inductor 70 passes through the switch 74 and is mirrored in the current transformer 76 connected in series with the switch 74. A replica of the current passing through switch 74 is obtained at the output of the current transformer 76. This current replica flows through the burden resistor 498 converting the current replica to a voltage replica of the current flowing in the switch 74. This voltage replica is applied to the current sense input 3 of chip 470 and is applied to the first input 495 of the comparator 498 contained within the chip. As indicated above, the error amplifier 480 contained with the chip 470 is not used and the output of the voltage follower 134 is connected to the output compensation pin 1 of the chip 470. The voltage output of follower 134, which represents the desired current level in the inductor 70, is applied to the output compensation pin 1 of the chip 470 and, in turn, is coupled to the other or second input 497 of the comparator 498 of chip 470.

When the switch 74 is closed the current therein will increase until such current reaches the level required in order that the voltages on the inputs 495 and 497 of the comparator 498 are equal at which time the comparator 498 changes state and the output at pin 6 of the chip 470 goes low, i.e. the switching signal is no longer on and switch 74 is "off". The circuit elements described above which are utilized to implement a constant off time of operation, then revert to the fixed off time so the inductor 70 can discharge the inductor current into the output capacitors C1 or C2. This basic fixed off time is generated by the resistor $R_T$ and $C_T$ where the junction of these elements are connected to the oscillator circuit 500 contained within the chip 470. Since the switching control signal at pin 6 is low the transistor 472 is non-conducting and the capacitor $C_T$ voltage rises as the current provided by the resistor $R_T$ flows into the capacitor $C_T$. When the voltage on the capacitor $C_T$ reaches the level required by the oscillator 500, the oscillator 500 discharges $C_T$ with an internal current sink to effect operation of the PWM latch 502 which results in output pin 6 of chip 470 again going high, i.e. the switching control signal reverts to the "on" state. The total constant off time includes the time to charge and discharge $C_T$. Now that the switching control signal is high, the transistor 472 inhibits recharging the capacitor $C_T$ by the current supplied by the resistor $R_{iT}$ and maintains the voltage to the oscillator 500 at a zero level. The inductor charge current will once again rise in the switch 74 repeating the cycle each time the current in the switch reaches the desired level, i.e., reaches that current which is substantially a replica of the instantaneous line voltage of the AC utility power source and is substantially in phase therewith. The conduction time of the switch 74 is a function of the time to charge the inductor 70 to the desired current level and this will fluctuate as a function of inductance and the voltage applied.

Referring now to the isolation and drive module 138, the same comprises an opto-coupler 365, an emitter follower shown generally at 366 and comprised of transistors 367 and 368 and gate oscillation prevention resistors 369 and 370. In a preferred embodiment, the opto-coupler 365 comprises an opto-coupler model HCPL2200, manufactured and sold by Hewlett-Packard Co. of Palo Alto, Calif. or its equivalent. The operation of this module 138 is such that when current flows in the light emitting diode 371 of the opto-coupler 365, the output 372 turns on, i.e. goes high, using the isolated power supply developed across capacitor 318 as described above. When the current stops flowing in the light emitting diode 371 the output 372 is off, i.e. goes low or zero volts. With the output 372 high, the transistor 368 conducts with current flowing through resistors 369 and 370 thereby charging the gate to source capacitance, respectfully, of the FET 86 and FET 88 to the voltage of output 372 minus one $V_{BE}$ of transistor 368. This action turns FET 86 and FET 88 on thereby permitting current to flow in either direction through FET 86 and FET 88. With the output 372 low, the emitter base junction of transistor 367 is forward biased discharging the gate to source capacitance of FET 86 and FET 88 through the resistors 369 and 370 thereby preventing current flow in either direction through FET 86 and FET 88.

From the foregoing it will be understood by those skilled in the art that the switch control means 78 includes means for generating a switching control signal which includes the pulse width modulation module and that the pulse width modulation means generates the switching control signal on its output in the form of a pulse train wherein the duration of each pulse thereof is controlled by the output voltage signal of the multiplier 120. Further, that the output of the PWM means is coupled to the switching means 74 for, during both the positive and negative half cycles of the AC utility power source, both (1) closing the switch 74 thereby permitting input current from the utility to flow to charge the inductor 70 and, (2) opening the switch 74 thereby permitting the inductor 70 to discharge the input current into the second rectifier means D3, D4. The switching means 74 are alternately closed and opened according to the presence or absence of the switching control signal on the output of the pulse width modulation module whereby the total current, comprising both the input current charged into the inductor 70 and the input current discharged from the inductor 70, passing through the inductor 70 is substantially a replica of and is substantially in phase with the line voltage of the AC utility power source.

While the invention has been described in connection with a single phase UPS system, it will be evident to those skilled in the art that the invention could be utilized with a three phase system. Further, while the present invention has been described in connection with a preferred embodiment of the UPS system and power factor correction circuit in accordance with the invention, and while specific logic and electrical configurations have been used to describe the present invention and a specific logic convention has been employed throughout the description, it will be apparent that many modifications and departures may be made therefrom without departing from the spirit and scope of the invention.

Having thus described our invention, we claim:

1. A power factor correction circuit for providing power factor correction directly to an AC electrical circuit comprising:
  (a) input connection means for connection to an AC utility power source and for receiving input current;
  (b) inductor means connected to said input connection means for charging and discharging said input current;
  (c) rectifier means connected to said inductor means for receiving discharged input current from said inductor means and for producing rectified inductor current when said input current is discharged from said inductor means;
  (d) switch means for conducting said input current on both the positive and negative half cycles of said AC utility power source, said switch means being connected to said inductor means, said rectifier means and said input connection means;
  (e) current sensing means for sensing the amount of said input charging current passing through said inductor means;
  (f) switch control means connected to said switch means, said switch control means including means coupled to said current sensing means for generating a switching control signal to close said switch means to permit said input current to charge said inductor means and to open said switch means to permit said inductor to discharge said input current into said rectifier means, said switch means being alternately closed and opened by said switching control signal such that the total current, comprising both said input current charged into said inductor means and said input current discharge from aid inductor means, passing through said inductor means is substantially similar to and is substantially in phase with the line voltage of said AC utility power source; and
  (g) output connection means coupled to said rectifier means for connecting to the electrical circuit, which includes capacitor means, which capacitor means receive said rectified inductor current and charge the voltages produced when said inductor means is discharged both during the positive and negative half cycles of said AC utility power source, a neutral line of the AC power utility power source being coupled to the electrical circuit without electrical interruption of the neutral line.

2. A power factor correction circuit according to claim 1 wherein said input connection means comprise:
  a first input terminal for connecting to a first conductor of said AC utility power source, and
  a second input terminal for connecting to a second conductor of said AC utility power source, and wherein said capacitor means comprises: first capacitor means, which first capacitor means receives said rectified inductor current and charges the voltage produced when said inductor means is discharged during the positive half cycle of said AC utility power source and,
  second capacitor means, which second capacitor means receives said rectified inductor current and charges the voltage produced when said inductor means is discharged during the negative half cycle of said AC utility power source.

3. A power factor correction circuit according to claim 1 wherein said means for generating a switching control signal comprises pulse width modulation means having a first input means, a second input means coupled to said current sensing means, and an output means, said pulse width modulation means generating said switching control signal on its output means in the form of a pulse train, said output means of said pulse width modulation means being coupled to said switch means for, during both the positive and negative half cycles of said AC utility power source, both
  (a) closing said switch means thereby permitting said input current to flow from said AC utility power source to charge said inductor means, and
  (b) opening said switch means thereby permitting said inductor means to discharge said input current into said rectifier means,
  said switch means being alternately closed and opened according to the presence or absence of said switching control signal on said output means of said pulse width modulation means.

4. A power factor correction circuit according to claim 1 wherein said capacitor means comprises:
  (a) first capacitor means which receives said rectified inductor current and charge the voltage produced when said inductor means is discharge during the positive half cycles of said AC utility power source, and
  (b) second capacitor means which receives said rectified inductor current and charges the voltage produced when said inductor means is discharged during the negative half cycle of said AC utility power source, and
  said switch control means further comprises:
  first scaling means operatively connected to said rectifier means for providing a first signal proportional to the voltage across said first capacitor means when said output connection means are connected to said electrical circuit means;

first generating means for generating a first reference signal representative of a desired voltage level across said first capacitor means;

first error signal generating means coupled to said first generating means and to said first scaling means for generating a first error signal representative of the difference between said first signal and said first reference signal;

second scaling means operatively connected to said rectifier means for providing a second signal proportional to the voltage across said second capacitor means when said output connection means are connected to said electrical circuit means;

second generating means for generating a second reference signal representative of said desired voltage level across said second capacitor means;

second error signal generating means coupled to said second generating means and to said second scaling means for generating a second error signal representative of the difference between said second signal and said second reference signal;

a multiplier circuit having a first multiplier input, a second multiplier input and a multiplier output;

first switching means operatively connected between said first error signal generating means and said first multiplier input;

second switching means operatively connected between said second error signal generating means and said first multiplier input;

line sensing means coupled to said input connection means and to said first and second switching means for providing a first switching signal and second switching signal, said first switching signal being applied to said first switching means during each positive half cycle of said AC utility power source to close said first switching means and effect application said first error signal to said first multiplier input, said second switching signal being applied to said second switching means during each negative half cycle of said AC utility power source to close said second switching means and effect application said second error signal to said first multiplier input;

third scaling means operatively connected to said input connection means for providing a third signal proportional to the instantaneous line voltage of said AC utility power source when said input connection means are connected to said AC utility power source; said third scaling means being coupled to said second multiplier input to apply said third signal thereto, said multiplier circuit producing a multiplier output voltage signal on said multiplier output which is a replica of the instantaneous line voltage of said AC utility power source multiplied alternately by said first and second error signals;

said means for generating a switching control signal comprising:

pulse width modulation means having a first input means, a second input means coupled to said current sensing means and an output means, said multiplier output coupled to said first input means to apply said multiplier output voltage signal thereto;

said pulse width modulation means generating said switching control signal on its output means in the form of a pulse train wherein the duration of each pulse thereof is controlled by said multiplier output voltage signal;

said output means of said pulse width modulation means being coupled to said switch means to apply said switching control signal thereto for, during both the positive and negative half cycles of said AC utility power source, both
(i) closing said switch means thereby permitting said input current to flow from said AC utility power source to charge said inductor means; and
(ii) opening said switch means thereby permitting said inductor means to discharge said input current into said rectifier means, said switch means being alternately closed and opened according to the presence or absence of said switching control signal on said output means of said pulse width modulation means whereby said total current flowing through said inductor means is substantially a replica of and is substantially in phase with the line voltage of said AC utility power source.

5. A power factor correction circuit according to claim 4 wherein said pulse width modulation means further comprises:
(a) voltage generating means coupled to said current sensing means for generating a voltage signal reflective of said input current flowing in said switch means;
(b) current sense comparator means coupled to said voltage generating means and coupled to said multiplier output an responsive to said voltage signal being equal to said multiplier output voltage signal for terminating said switching control signal; and
(c) timing means responsive to the termination of said switching control signal for holding said switching control signal off for a predetermined time interval and, at the end of said time interval, operable for turning said switching control signal on.

6. A power factor correction circuit for providing power factor correction directly to an AC electrical circuit comprising:
(a) input connection means for connection to an AC utility power source and for receiving input current;
(b) inductor means connected to said input connection means for charging and discharging said input current;
(c) rectifier means connected to said inductor means for receiving discharged input current from said inductor means and for producing rectified inductor current when said input current is discharged from said inductor means;
(d) switch means for conducting said input current on both the positive and negative half cycles of said AC utility power source, said switch means being connected to said inductor means, said rectifier means and said input connection means;
(e) switch control means connected to said switch means, said switch control means including means for generating a switching control signal for
(i) closing said switch means to permit said input current to charge said inductor means; and
(ii) opening said switch means to permit said inductor means to discharge said input current;
said switch means being alternately closed and opened by said switching control signal such that the total current, comprising both said input current charged into said inductor means and said input current discharged from said inductor means, passing through said inductor means is substantially a replica of and is substantially in phase with the line voltage of said AC utility power source; and (f) output connection means coupled to said rectifier means for connecting to the electrical circuit, which includes first capacitor means, which first capacitor means receives said rectified inductor current and charges the voltage produced when said inductor means is discharged during the positive half cycle of said AC utility power source and second capacitor means, which second capacitor means receives said rectified inductor current and charges the voltage produced when said inductor means is discharged during the negative half cycle of said AC utility power source;

said rectifier means producing rectified line +DC voltage across said first capacitor and producing rectified line −DC voltage across said second capacitor when said input connection means are connected to said AC utility power source, a neutral line of the AC utility power source being coupled to the electrical circuit without electrical interruption of the neutral line.

7. A power factor correction circuit according to claim 6 wherein said switch control means further comprises:

first scaling means operatively connected to said rectifier means for providing a first signal proportional to the voltage across said first capacitor means when said output connection means are connected to said electrical circuit means;

first generating means for generating a first reference signal representative of a desired voltage level across said first capacitor means;

first error signal generating means coupled to said first generating means and to said first scaling means for generating a first error signal representative of the difference between said first signal and said first reference signal;

second scaling means operatively connected to said rectifier means for providing a second signal proportional to the voltage across said second capacitor means when said output connection means are connected to said electrical circuit means;

second generating means for generating a second reference signal representative of said desired voltage level across said second capacitor means;

second error signal generating means coupled to said second generating means and to said second scaling means for generating a second error signal representative of the difference between said second signal and said second reference signal;

a multiplier circuit having a first multiplier input, a second multiplier input and a multiplier output;

first switching means operatively connected between said first error signal generating means and said first multiplier input;

second switching means operatively connected between said second error signal generating means and said first multiplier input;

line sensing means coupled to said input connection means and to said first and second switching means for providing a first switching signal and second switching signal, said first switching signal being applied to said first switching means during each positive half cycle of said AC utility power source to close said first switching means and effect application said first error signal to said first multiplier input, said second switching signal being applied to said second switching means during each negative half cycle of said AC utility power source to close said second switching means and effect application said second error signal to said first multiplier input;

third scaling means operatively connected to said input connection means for providing a third signal proportional to the instantaneous line voltage of said AC utility power source when said input connection means are connected to said AC utility power source; said third scaling means being coupled to said second multiplier input to apply said third signal thereto, said multiplier circuit producing a multiplier output voltage signal on said multiplier output which is a replica of the instantaneous line voltage of said AC utility power source multiplied alternately by said first and second error signals; and, current sensing means coupled to said switch means for sensing the amount of said input current passing through said switch means;

said means for generating a switching control signal comprising:

pulse width modulation means having a first input means, a second input means coupled to said current sensing means and an output means, said multiplier output coupled to said first input means to apply said multiplier output voltage signal thereto;

said pulse width modulation means further including (i) voltage generating means coupled to said current sense means through said input means for generating a voltage signal reflective of the said input current flowing in said switch means;

(ii) current sense comparator means connected to said voltage generating means and to said multiplier output and responsive to said voltage signal being equal to said multiplier output voltage signal for terminating said switching control signal; and (iii) timing means responsive to the termination of said switching control signal for holding said switching control signal off for a predetermined time interval and, at the end of said time interval, operable for turning said switching control signal on, said pulse width modulation means generating said switching control signal on its output means in the form of a pulse train wherein the duration of each pulse thereof is controlled by said multiplier output voltage signal;

said output means of said pulse width modulation means being coupled to said switch means for, during both the positive and negative half cycles of said AC utility power source, both (iv) closing said switch means thereby permitting said input current to flow from said AC utility power source to charge said inductor means; and (v) opening said switch means thereby permitting said inductor means to discharge said input circuit into said rectifier means, said switch means being alternately closed and opened according to the presence or absence of said switching control signal on said output means of said pulse width modulation means whereby the total current, comprising both said input current charged into said inductor means and said input current discharged from said inductor means, passing through said inductor means is a substantial replica of and is substantially in phase with the line voltage of said AC utility power source.

8. An uninterrupted power supply (UPS) system comprising:
rectifier means having a first input terminal for connection to a first conductor of an AC utility power source, a second input terminal for connection to a second conductor of said AC utility power source, a first output terminal and a second output terminal;
a first capacitor connected between said first output terminal of said rectifier means and said second input terminal;
a second capacitor connected between said second output terminal of said rectifier means and said second input terminal;
said rectifier means producing rectified line +DC voltage across said first capacitor and producing rectified line −DC voltage across said second capacitor when said first and second input terminals of said rectifier means are connected, respectively, to the first conductor and second conductor of said AC utility power source; and
power factor correction circuit means operatively connected to said first and second input terminals of said rectifier means and operatively connected to said first and second output terminals of said rectifier means for directly controlling the alternating current input current received by the UPS system to cause the UPS system to exhibit substantially unity power factor to the AC utility power source, a neutral line of the AC utility power source is being coupled to the electrical circuit without electrical interruption of the neutral line.

9. An uninterrupted power supply (UPS) system according to claim 8 further comprising:
first and second load terminals for connection to a load, said second input terminal of said rectifier means being connected to said first load terminal; and
inverter means operatively connected to said first and second output terminals of said rectifier means and said second load terminal for conversion of said direct current voltages produced by said rectifier means to AC voltages across said first and second load terminals.

10. Uninterrupted power supply (UPS) system according to claim 8 wherein said power factor correction circuit includes
a first input means connected to said first input terminal of said rectifier means;
a second input means connected to said second input terminal of said rectifier means;
a first output means connected to the first output terminal of said rectifier means; and
a second output means connected to the second output terminal of said rectifier means.

11. An uninterrupted power supply (UPS) system according to claim 8 wherein said power factor correction circuit comprises:
(a) input connection means comprising first input means connected to said first input terminal of said rectifier means and second input means connected to said second input terminal of said rectifier means for receiving input current from said AC utility power source when said first and second input terminals of said rectifier means are connected, respectively, to the first conductor and second conductor or said AC utility power source;
(b) inductor means connected to said input connection means for charging and discharging said input current;
(c) second rectifier means connected to said inductor means for receiving discharged input current from said inductor means and for producing rectified inductor current when said input current is discharged from said inductor means;
(d) switch means for conducting said input current on both the positive and negative half cycles of said AC utility power source, said switch means being connected to said inductor means, said second rectifier means and said input connection means;
(e) current sensing means coupled to said switch means for sensing the amount of said input current passing through said switch means;
(f) switch control means connected to said switch means, said switch control means including means coupled to said current sensing means for generating a switching control signal to close said switch means to permit said input current to charge said inductor means and to open said switch means to permit said inductor to discharge said input current into said second rectifier means, said switch means being alternately closed and opened by said switching control signal such that the total current, comprising both said input current charged into said inductor means and said input current discharged from said inductor means, passing through said inductor means is substantially a replica of and is substantially in phase with the line voltage of said AC utility power source; and
(g) output connection means comprising first output means connected to the first output terminal of said rectifier means and second output means connected to the second output terminal of said rectifier means,
said first capacitor means receiving said rectified inductor current and charging the voltage produced when said inductor means is discharged during the positive half cycle of said AC utility power source and said second capacitor means receiving said rectified inductor current and charging the voltage produced when said inductor means is discharged during the negative half cycle of said AC utility power source;
said rectifier means being back biased when said power factor correction circuit is operatively connected to said first and second input terminals and first and second output terminals of said rectifier means, and said first and second input terminals of said rectifier means are connected respectively, to the first conductor and second conductor of said AC utility power source,
said second rectifier means producing rectified line +DC voltage across said first capacitor and producing rectified line −DC voltage across said second capacitor means when said rectifier means are back biased.

12. An uninterrupted power supply (UPS) system according to claim 11 wherein said mean for generating a switching control signal comprises pulse width modulation means having a first input means, a second input means coupled to said current sensing means, and an output means, said pulse width modulation means generating said switching control signal on its output means in the form of a pulse train, said output means of said pulse width modulation means being coupled to said switch means for, during both the positive and negative half cycles of said AC utility power source, both
  (a) closing said switch means thereby permitting said input current to flow from said AC utility power source to charge said inductor means, and
  (b) opening said switch means thereby permitting said second inductor means to discharge said input current into said second rectifier means,
said switch means being alternately closed and opened according to the presence or absence of said switching control signal on said output means of said pulse width modulation means.

13. An uninterrupted power supply (UPS) system according to claim 11 wherein said switch control means further comprises;
  first scaling means operatively connected to said second rectifier means and to said first capacitor for providing a first signal proportional to the voltage across said first capacitor;
  first generating means for generating a first reference signal representative of a desired voltage level across said first capacitor;
  first error signal generating means coupled to said first generating means and to said first scaling means for generating a first error signal representative of the difference between said first signal and said first reference signal;
  second scaling means operatively connected to said second rectifier means for providing a second signal proportional to the voltage across said second capacitor;
  second generating means for generating a second reference signal representative of said desired voltage level across said second capacitor;
  second error signal generating means coupled to said second generating means and to said second scaling means for generating a second error signal representative of the difference between said second signal and said second reference signal;
  a multiplier circuit having a first multiplier input, a second multiplier input and a multiplier output;
  first switching means operatively connected between said first error signal generating means and said first multiplier input;
  second switching means operatively connected between said second error signal generating means and said first multiplier input;
  line sensing means coupled to said input connection means and to said first and second switching means for providing a first switching signal and second switching signal, said first switching signal being applied to said first switching means during each positive half cycle of said AC utility power source to close said first switching means and effect application said first error signal to said first multiplier input, said second switching signal being applied to said second switching means during each negative half cycle of said AC utility power source to close said second switching means and effect application said second error signal to said first multiplier input;
  third scaling means operatively connected to said input connection means for providing a third signal proportional to the instantaneous line voltage of said AC utility power source when said input connection means are connected to said AC utility power source; said third scaling means being coupled to said second multiplier input to apply said third signal thereto,
  said multiplier circuit producing a multiplier output voltage signal on said multiplier output which is a replica of the instantaneous line voltage of said AC utility power source multiplied alternately by said first and second error signals;
  said means for generating a switching control signal comprising:
  pulse width modulation means having a first input means, a second input means and an output means, said multiplier output coupled to said input means to apply said multiplier output voltage signal thereto;
  said pulse with modulation means generating said switching control signal on its output means in the form of a pulse train wherein the duration of each pulse thereof is controlled by said multiplier output voltage signal;
  said output means of said pulse width modulation means being coupled to said switch means for, during both the positive and negative half cycles of said AC utility power source, both
    (1) closing said switch means thereby permitting said input current to flow from said AC utility power source to charge said inductor means; and
    (2) opening said switch means thereby permitting said inductor means to discharge said input current into said second rectifier means,
  said switching means being alternately closed and opened according to the presence or absence of said switching control signal on said output means of said pulse width modulation means whereby the total current flowing through said inductor means is substantially a replica of and is substantially in phase with the line voltage of said AC utility power source.

* * * * *

UNITED STATES PATENT AND TRADEMARK OFFICE
CERTIFICATE OF CORRECTION

PATENT NO. : 4,980,812

DATED : December 25, 1990

INVENTOR(S) : Robert W. Johnson, Jr. and Joseph C. Paulakonis

It is certified that error appears in the above-identified patent and that said Letters Patent is hereby corrected as shown below:

Col. 11, line 64, please change "aid" to --said--.

Signed and Sealed this

Eleventh Day of August, 1992

Attest:

DOUGLAS B. COMER

*Attesting Officer*  *Acting Commissioner of Patents and Trademarks*